United States Patent

[11] 3,618,988

| [72] | Inventor | Robert C. Zurmuehlen<br>Jennings, Mo. |
| [21] | Appl. No. | 864,131 |
| [22] | Filed | Oct. 6, 1969 |
| [45] | Patented | Nov. 9, 1971 |
| [73] | Assignee | American Air Filter Company, Inc.<br>Louisville, Ky. |

[54] DUCT CONNECTOR ARRANGEMENT
3 Claims, 1 Drawing Fig.

[52] U.S. Cl. ..................................................... 285/312,
285/347
[51] Int. Cl. ........................................................ F16l 37/10,
F16l 37/20
[50] Field of Search .......................................... 285/311,
420, 312, 238, 347

[56] References Cited
UNITED STATES PATENTS

| 2,133,558 | 10/1938 | Miller | 285/420 X |
| 3,489,434 | 1/1970 | Haley | 285/311 X |
| 603,366 | 5/1898 | Riehl | 285/311 |
| 2,951,717 | 9/1960 | Zaber | 285/311 |
| 3,379,460 | 4/1968 | Allyn | 285/312 |

*Primary Examiner*—Dave W. Arola
*Attorney*—Ralph B. Brick

ABSTRACT: A duct connector arrangement which includes first ring means carried by a first duct and a second ring means carried by a second duct and freely rotatable thereon. Cooperative lock means are attached to one ring to be received by slot means in the other ring means to coupled the fist and second duct means together.

PATENTED NOV 9 1971 3,618,988
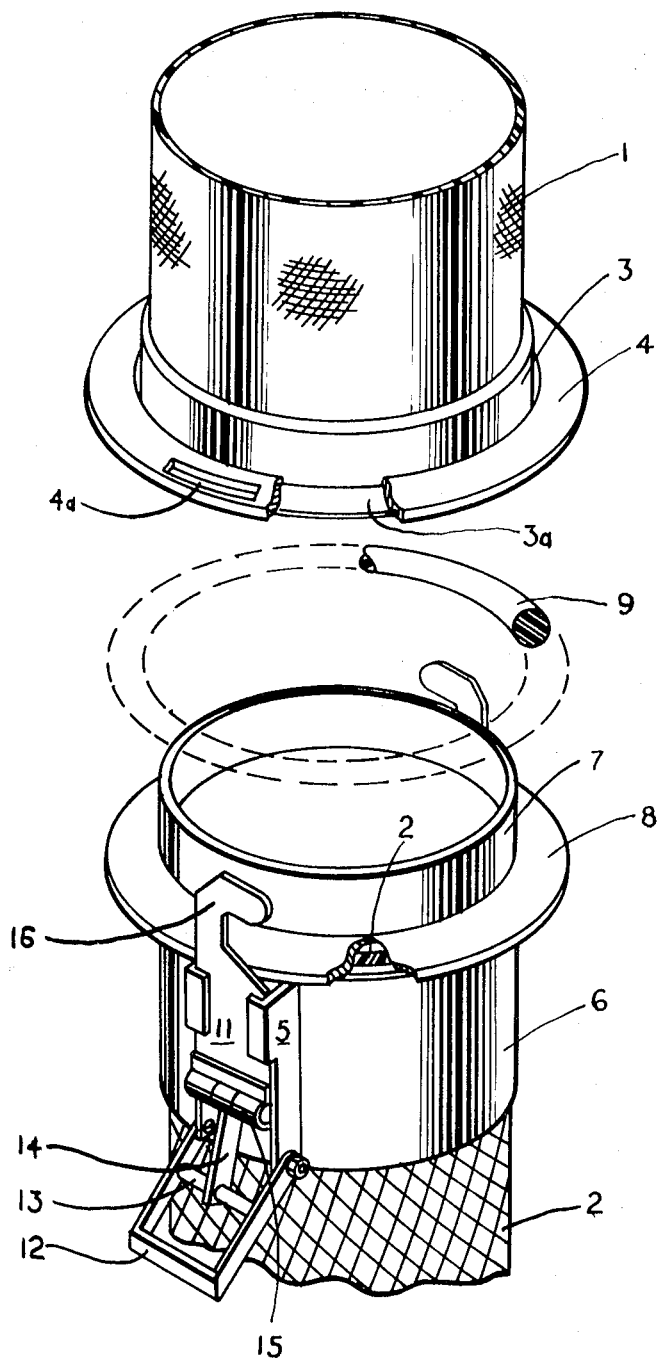
INVENTOR.
ROBERT C. ZURMUEHLEN
BY
Ralph B. Brick
ATTORNEY.

DUCT CONNECTOR ARRANGEMENT

BACKGROUND OF THE INVENTION

Previous coupling arrangements have been provided to connect first and second sections of pipe together in communicative generally aligned relation where the coupler is rotatably carried by the first pipe and includes catch means to be received by the cooperative receptacle means of the second section of pipe. Such arrangements generally have been of cast metal construction and are very expensive and complex to manufacture.

In other arrangements, clasp means have been rotatably mounted on a first pipe to grasp the second pipe directly where the clasp includes means to reduce the diameter of the clasp to lock onto the second pipe.

In such arrangements, the alignment of the conduits is difficult, the elements comprising the connecting arrangement are expensive, and the arrangement cannot withstand great stress without releasing the conduits one from the other.

SUMMARY OF THE INVENTION

The present invention provides a straightforward, economical arrangement for connecting first and second ducts in communicative relation.

Moreover, it is recognized the present invention provides an arrangement where first and second duct means are drawn into communicative alignment by the fastening device and where the conduits are securely fastened to withstand significant stress without separation.

Various other features of the present invention will become obvious to those skilled in the art upon reading the disclosure set forth hereinafter.

More particularly, the present invention provides an arrangement for connecting a first duct in communicative relation with a second duct comprising: first ring means carried by one end of the first duct in freely rotatable relation thereon; second ring means connected to the end of the second duct which is to be connected to the first duct; latch means carried by at least one of the ring means, and cooperative latch-receiving means carried by the other ring means.

It is to be understood that the description of one example of the present invention given hereinafter is not by way of limitation, and that various changes can be made in the arrangement, form, or configuration of the apparatus disclosed without departing from the scope or spirit of the present invention.

Referring now to the FIGURE, the example of the apparatus shown in accordance with the present invention includes a clamp arrangement to connect a first duct 1 in communicative, aligned relation with a duct 2. Duct 1 can be, for example, a rigid metallic duct connected to an apparatus (not shown) to provide a fluid stream to duct 2 which can, for example, be flexible.

Duct 1 has joined thereto a peripheral shell 3, the cylindrical body thereof having an out-turned rim 3a. A ring 4, having opposed cooperative slot means 4a, as hereinafter described, is freely rotatable on shell 3 and retained on the duct by rim 3a. Flexible duct 2 likewise has joined thereto a shell 7, the cylindrical body of which has an out-turned rim 8 extending outwardly from the end of the shell. The cylindrical body of shell 7 is sized relative the cylindrical body of shell 3 to engage telescopically therewithin with the respective rims of the shells being sized to face each other.

A gasket 9 is provided to be received by rim 8 to be compressed between rim 3a of shell 3 and rim 8 and the cylindrical body of shell 7 to form a seal between the ducts 1 and 2.

A ring 6 is provided on duct 2. This ring 6 is freely rotatable on the duct, and carries a latch mechanism, hereinafter described, which is particularly suitable for the application shown.

In the example shown, the latch means comprises a pair of latches fixed to opposite sides of ring 6, each latch including a pair of opposed plates 5 of L-shaped configuration having in-turned lips and disposed in spaced relation longitudinally along ring 6 to provide a guideway for a movable latch plate 11, as shown, which is slidably received between plates 5 and retained in position by the in-turned lips of the plates. A U-shaped actuating lever 12 is pivotally secured to the ends of plate 5 and crossbar 13 is mounted between the sides of lever 12. A connecting member 14 is pivotally connected at one end to crossbar 13 and at the other end to a hinge connector 15 fastened to the rear edge of latch 11. A hook 16 is provided at the opposite edge of each latch plate 11 and is adapted to be cooperatively received by a slot 4a in clamp ring 4.

To fasten ducts 1 and 2, gasket 9 is placed around shell 7 to rest on lip 8. The body of shell 7 then is telescopically inserted in the cylindrical body of shell 3 to align the ducts. Rings 4 and 6 then are rotated about ducts 1 and 2, respectively, until hook 16 of each latch plate 11 is in aligned relation with a cooperative slot 4a of ring 4. The hook of each latch plate then is inserted through the respective slot, rings 4 and 6 are rotated relative to each other so the inner surface of hooks 16 engage ring 4 and lever 12 of each latch then is pushed toward duct 2, so hooks 16 contact ring 4 to draw the assembly together and compress gasket 9 between the body of shell 7 and rims 3a and 8.

I claim:

1. Apparatus for connecting a first duct in communicative, aligned relation with a second duct comprising: first ring means extending completely around and having a substantially constant axial thickness carried by one end of said first duct; a first shell means surrounding said end of said first duct to retain said first ring means on said first duct; second ring means extending completely around and having a substantially constant axial thickness connected to the end of said second duct which is to be connected to said first duct; a second shell means surrounding said end of said second duct to retain said second ring means on said second duct; latch means carried by at least one of said ring means said at least one of said ring means in fully rotatable relation on at least one of said ducts; whereby said fully rotatable movement may occur without relative axial movement between said at least one of said ducts and said at least one of said ring means; and cooperative latch-receiving means carried by the other said ring means to receive said latch means to retain said first and second duct means in generally aligned relation.

2. The apparatus of claim 1 wherein said first and second shell means each include rim members extending longitudinally outwardly therefrom, said rim members being sized to face each other in sealed relation upon latching.

3. The apparatus of claim 2, said shells being sized to telescope one into the other, and a gasket member sized to surround the male shell and be compressed between the body thereof and the faced rim members upon latching.

* * * * *